Figure 6:
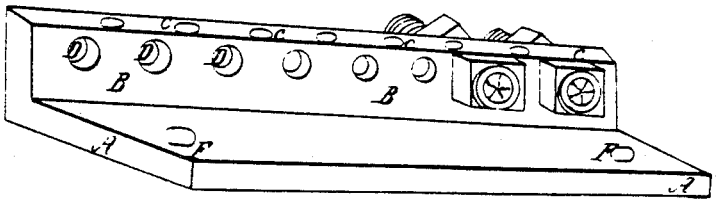
Figure 4:
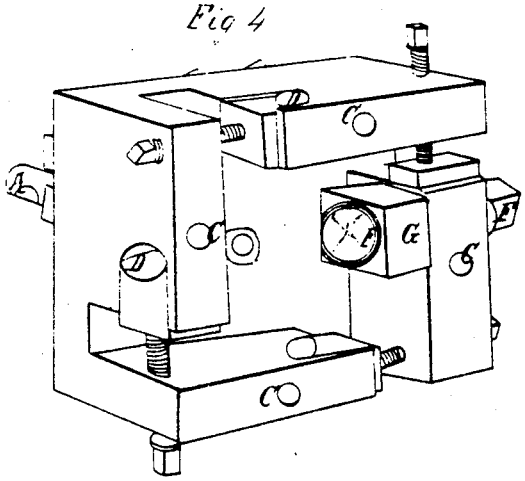
Figure 5B:
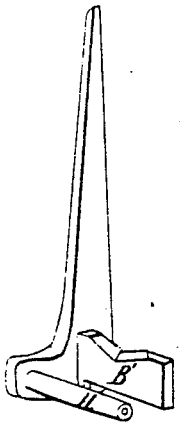
Figure 5A:
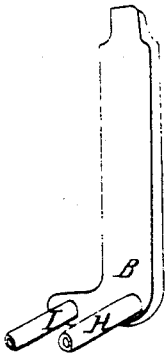
Figure 7:
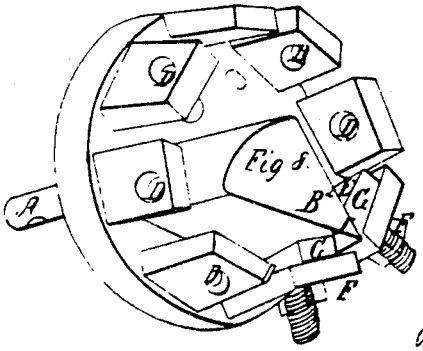

J. B. Bellemere.

Dressing Bolt-Heads.

BEST AVAILABLE COPY

No. 34. A. I. Patented Sept. 10, 1840.

Inventor:
J. B. Bellemere

THE GRAPHIC CO. PHOTO-LITH. 39 & 41 PARK PLACE, N.Y.